Sept. 4, 1934.  A. PAYS  1,972,666
METHOD AND MACHINE FOR THE TREATMENT OF GRAIN
Filed March 10, 1932   2 Sheets-Sheet 1
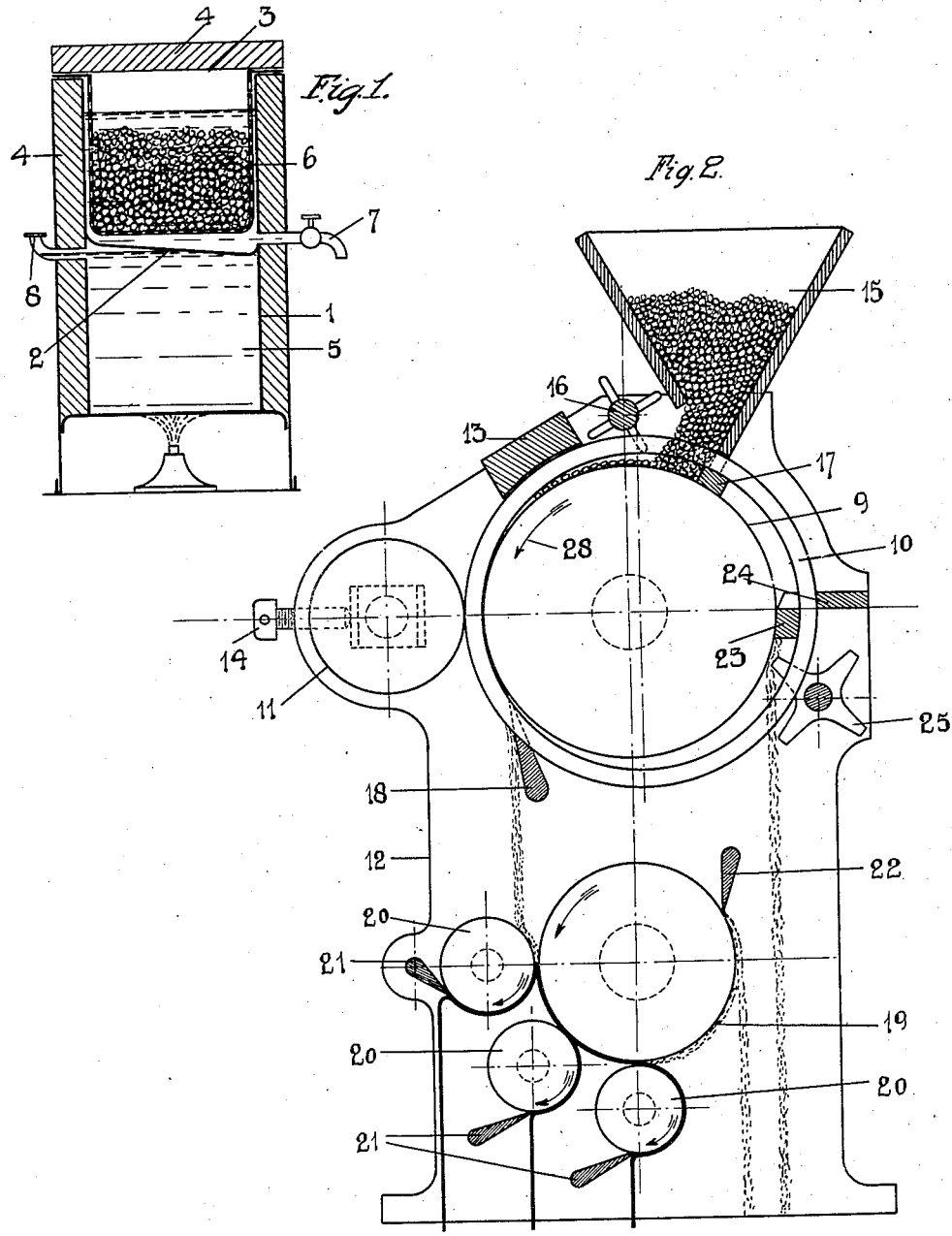
Inventor:
Achille Pays,
By C. F. Ostenroth
Atty

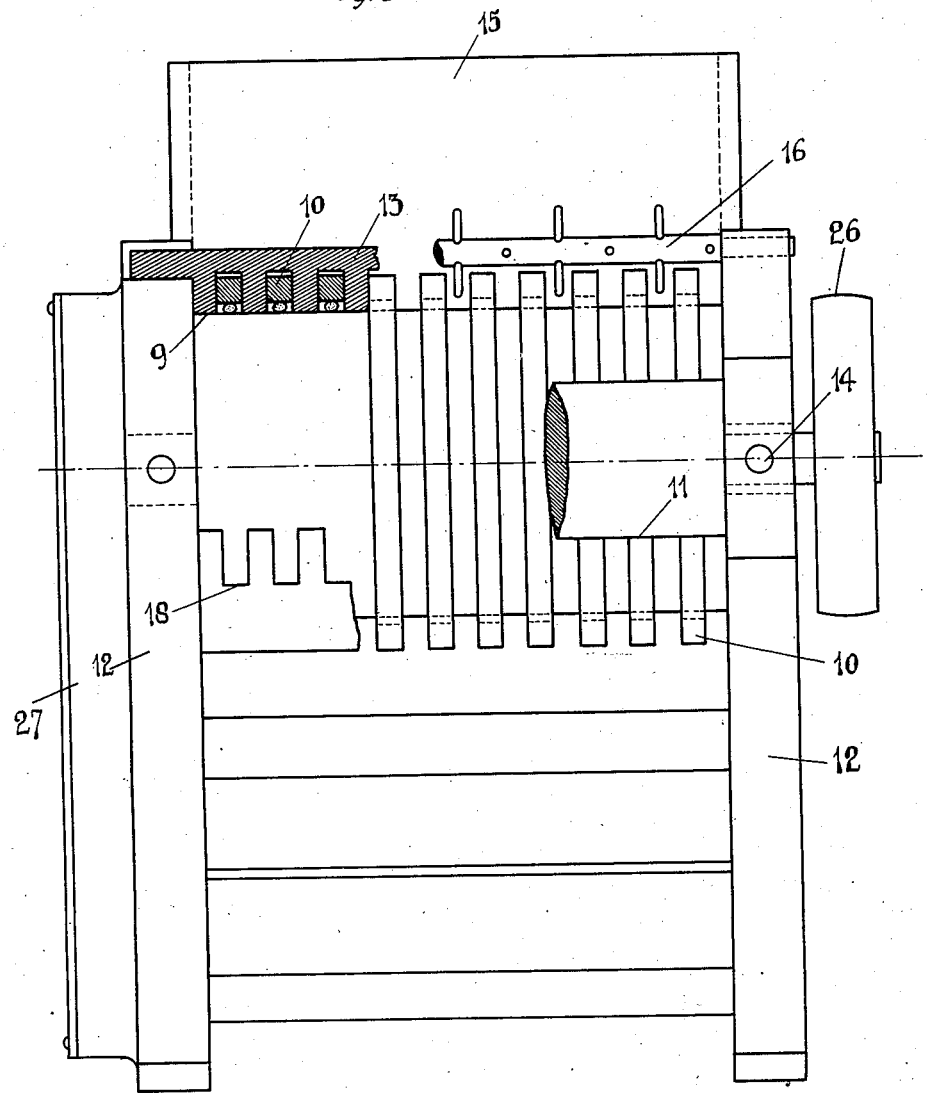

Patented Sept. 4, 1934

1,972,666

UNITED STATES PATENT OFFICE 1,972,666

METHOD AND MACHINE FOR THE TREATMENT OF GRAIN

Achille Pays, Nantes, France

Application March 10, 1932, Serial No. 598,016
In France April 10, 1931

6 Claims. (Cl. 83—28)

In order to simplify work, and also to obtain products of a better quality, it has always been deemed desirable to manufacture bread directly by crushing corn softened by immersion in water. However, there are two difficulties which prevent the use of that method of manufacturing bread.

The first of these difficulties is that when corn is left in water for a sufficiently long time that it may subsequently be easily ground, said corn loses a part of its qualities. This is due to the fact that, at the beginning, water penetrates into the grains, carrying along with it the nutritive juices of the husks; then it hydrates the gluten, which is particularly abundant under the husk, and finally reaches the starch, but the latter hydrates but slowly. At that time, the grain still keeps all its qualities, but the central core is still hard. If the grain is further maintained in water until said core is softened, the water that has penetrated into the grain mixes with that which surrounds it, and the nutritive juices leave the grain, to be diluted in the liquid mass. Moreover, the fermentations that take place deteriorate the gluten.

The second difficulty is the removal of chaff. When grain is ground in the dry state, the bran is easily separated from the flour, but if wet grain is ground, the mixture of paste and bran which leaves the grinding cylinders is so thoroughly agglomerated by the gluten that it is extremely difficult to separate the two products.

The present invention has for its object a process for the panification of cereals which is free from these drawbacks. It consists in hydrating the grains by immersing them into water at a suitable temperature (preferably about 45–50° C.) during a determined period of time (said period of time being in fact that during which the weight of the grain increases in a substantial manner) and subsequently allowing them to remain in a warm atmosphere out of the presence of water until they are softened, said softening process preferably taking place at the same temperature as the moistening.

The grains thus treated are then, according to my invention, crushed one by one so that the bran may remain upon the crushing or grinding organs and that the paste may be driven out of said organs, which makes it possible to separately collect these two products.

My invention further comprises, for the carrying out of the process of panification above mentioned, a stove and an apparatus for grinding the grains and separating the paste from the bran.

The stove according to my invention comprises a chamber in which is disposed the grain to be hydrated and to be subsequently allowed to soften out of the presence of water. Said stove is suitably heat insulated and has a great calorific capacity.

The apparatus for grinding the grains and separating the paste from the bran comprises grinding organs under which the grains pass one by one in a continuous series. Said grains are crushed by being forced between two surfaces forming a very small angle between them, and the grinding organs are so devised that they may retain the bran, while the paste is expelled from said organs, which makes it possible to collect separately these two products.

According to a preferred embodiment of my invention, said apparatus may consist of a drum and movable rings disposed at equal intervals about said drum. Said rings, which form the grinding organs, have a width equal to that of a flattened grain, and retain the bran after the grains have been crushed. The paste, freed from the bran, is driven laterally into the intervals between the rings.

Said paste, which falls in the form of flakes, must be thoroughly mixed. To this effect, I make use according to my invention, of a series of finishing cylinders having differential speeds of revolution, and between which the paste is caused to flow, said paste being progressively rolled and freed from the little particles of bran that might be present therein.

A preferred embodiment of my invention will be hereinafter described with reference to the accompanying drawings, given merely by way of example, and in which:—

Fig. 1 is a vertical sectional view of the stove in which the grain is moistened;

Fig. 2 is a transverse sectional view of the grinding mill; and,

Fig. 3 is a front view of the same apparatus, some parts being cut off.

The stove (Fig. 1) consists of a reservoir 1, divided into two parts by a liquid-tight partition 2 and closed by a lid 3. The reservoir and the lid are protected by a heat insulating envelope 4. The lower compartment is filled with water or any other liquid having a high calorific capacity. The upper part comprises a movable bottom 6 made of perforated sheet metal, and adapted to support the grain, while allowing the softening water to pass through it. A cock 7 makes it possible to discharge said water, and connection 8 serves to the filling of the lower compartment 5.

The grinding and separating mill (Fig. 2 and Fig. 3) comprises, as its essential parts, drum 9, rings 10 and driving member 11, the whole being supported by uprights 12. Rings 10 have a width equal to the width of a flattened grain and their diameter is slightly greater than that of drum 9. They are separated by stationary guide 13. Owing to screws 14, the driving member 11 strongly applies said rings against drum 9 for grinding the grains. The grain is placed in hopper 15, under which stirring organ 16 is caused to rotate. The arms of said stirring organ pass between rings 10 and help the grains to place themselves under the rings. A bar 17, running along the whole length of drum 9, prevents the grains from falling back.

The paste that is formed in the machine is collected by scraper 18 which corresponds in shape with rings 10, and said paste subsequently passes between central cylinder 19 and secondary cylinders 20.

Said organs are connected together through toothed wheels in such manner that the periphery of cylinder 19 moves with a slower speed than that of cylinders 20. Furthermore, the surface of cylinder 19 is rough, while the surface of cylinders 20 is smooth. From that double difference it results that the paste is driven along by rollers 20, while cylinder 19 keeps back the particles of bran that may still be present in the paste.

The paste is detached from cylinders 20 by scrapers 21, while the bran is detached from cylinder 19 by scraper 22. The bran that adheres to drum 9 and under rings 10 is stopped by piece 23, which is carried along the whole length of the drum by the teeth of a comb-shaped piece 24. Said bran, which accumulates at that place, is removed by the teeth of revolving extractor 25. Pulley 26, which is keyed on the shaft of driving member 11, is actuated by a suitable engine and transmits its movement to the various movable organs of the apparatus through a series of gears disposed laterally in a casing 27.

The treatment of the grain in the stove takes place in the following manner: The corn, in a clean state, for instance washed in a great quantity of water, is placed on the movable bottom 6 and a sufficient quantity of water is poured in the stove to submerge said grain. The temperature of the whole is maintained at about 45-50° C. by heating the liquid mass in compartment 5. After a period of about 7 hours, although the grain is still hard, it does not absorb any more water. Cock 7 is then opened so that the whole excess of water passes through perforated bottom 6 and flows out. The grain is then left in the stove, preferably at a temperature of 45-50° C. for a period of time of at least 8 hours. During that period, the husk and the gluten that lies thereunder, which up to then kept about the whole of the water absorbed by the grain, let that water pass into the starch, which slowly becomes hydrated. At the end of that period, the grain is sufficiently softened to be easily crushed, while it has not lost anything of its nutritive juices and has not been subjected to any fermentation.

The grain thus prepared is placed in hopper 15 and pulley 26 is actuated so as to start the apparatus. Rings 10, which are held between drum 9 and driving member 11, are caused to rotate in the direction of arrow 28 and carry along with them the grains that come from hopper 15 under the action of stirring organ 16.

Guide 13, the teeth of which extend as far as the periphery of drum 9, allow only the grains located between said drum and rings 10 to pass. Moreover, said grains are compelled to pass one by one, because the width of the rings is not sufficient to allow two grains to pass at the same time.

When they have moved past guide 13, the grains are progressively flattened. The bran is kept back under rings 10, while the paste flows laterally into the intervals between said rings. At the point where drum 9 and rings 10 are tangent to each other, there remains only bran under the rings, the whole of the paste having been driven into the intervals between said rings.

Said paste, which is collected a little further on by scraper 18, falls, in the form of flakes, between rollers 19 and 20, and it is progressively rolled by its passage between main roller 19 and small rollers 20. The paste preferably adheres to the smooth surface of rollers 20, the periphery of which moves more rapidly, while the rough surface and the slower movement of roller 19 cause the small particles of bran that have been carried along by the paste to adhere to said roller 19. Finally, the paste is detached from rollers 20 by scrapers 21 and the bran from cylinder 19 by scraper 22.

The bran that is stuck to drum 9 and to rings 10 is stopped by piece 23 and comb-shaped piece 24, and as extractor 25 detaches said bran as it is accumulating there, the bran falls on the ground close to that which is detached from scraper 22.

While I have disclosed what I deem to be a practical and efficient embodiment of my invention, it should be well understood that I do not wish to be limited thereto as there might be changes made in the arrangement, disposition and form of the parts without departing from the principle of my invention as comprehended within the scope of the appended claims.

What I claim is:

1. A method of treating grain which comprises two steps the first step consisting in immersing the grain in water at a temperature of about 45-50° C. until the increase of volume of the grain through absorption of water becomes very slow, and the second step consisting in removing the grain from water and allowing the moistened grain to remain for several hours at a temperature of about 45-50° C. until it is thoroughly moistened.

2. A method of treating grain which comprises two steps, the first step consisting in immersing the grain in water at a temperature of about 45-50° C. for a period of time of about 7 hours, and the second step consisting in removing the grain from water, and allowing the grain thus moistened to remain for at least eight hours at a temperature of about 45-50° C., after which the grain is crushed, and the bran is separated from the paste.

3. A machine for treating moistened grain which comprises in combination, a solid and rigid drum, a plurality of solid and rigid circular shaped crushing organs disposed in substantial tangential relation with respect to said drum, each crushing organ having a width substantially equal to the width of a flattened grain, means for causing the grain to engage one by one between said crushing organs and said drum at points located at a certain distance from the line along which said crushing organs are substantially tangential to said drum, means for simultaneously rotating said crushing organs and said drum whereby the grain thus inserted between them is squeezed by being wedged toward the line along which said crushing organs are substantially tangential to said drum, means for detaching the paste resulting from the crushing operation from the drum and means for removing the bran from said drum and from said crushing organs.

4. A machine for treating softened grain which comprises in combination, a drum, a plurality of rings having an inner diameter substantially greater than the outer diameter of said drum disposed at regular intervals from one another around said drum, means for applying said rings against said drum along one of the generatrices of said drum, means for rotating said rings, a guiding member having teeth extending between said rings to the periphery of said drum for causing the grains to engage into the space between the rings and the drum, a hopper for feeding grains onto said drum above said guiding member, a toothed scraper located below the generatrix of contact of the drum with the rings for removing the paste from the drum, a bar located between said drum and said rings substantially opposite said generatrix for preventing accumulation of bran between the rings and the drum, and rotary means for detaching the bran as it is brought against said bar.

5. A machine for treating softened grain which comprises in combination, a drum, a plurality of rings having an inner diameter substantially greater than the outer diameter of said drum disposed at regular intervals from one another around said drum, the width of each ring being substantially equal to the width of a flattened grain, a cylinder parallel to said drum, means for causing said cylinder to strongly apply said rings against said drum, means for rotating said cylinder, a guiding member having teeth extending between said rings to the periphery of said drum for compelling the grains to engage between said rings and said drum, a hopper for feeding grains onto said drum above said guiding member, a toothed scraper located below the generatrix of contact of said drum with said rings for removing the paste from said drum, a bar parallel to said drum and extending between it and said rings along the generatrix diametrally opposed to the first mentioned generatrix for stopping the bran remaining between said rings and said drum, rotary means for detaching the bran that accumulates against said bar.

6. A machine according to claim 5 further comprising a main roller disposed below said drum and having a rough periphery, and a plurality of smooth rollers adapted to cooperate with said main roller for forcing the paste to pass between them and said main roller, a plurality of scrapers for detaching the paste from said smooth rollers and a scraper for detaching bran from said main roller.

ACHILLE PAYS.